United States Patent [19]

Kumakura et al.

[11] Patent Number: 5,726,767
[45] Date of Patent: Mar. 10, 1998

[54] AUTOMATIC FACSIMILE SIGNAL ANALYZING APPARATUS FOR A TELEPHONE EXCHANGE SYSTEM

[75] Inventors: Hiroshi Kumakura; Takashi Itani; Ken-ichi Nishimura; Hideki Amano; Masayoshi Sato, all of Tokyo, Japan

[73] Assignees: Nec Corporation; Kokusai Denshin Denwa Co. Ltd., both of Tokyo, Japan

[21] Appl. No.: 497,077

[22] Filed: Jun. 30, 1995

[30] Foreign Application Priority Data

Jun. 30, 1994 [JP] Japan ................. 6-149849

[51] Int. Cl.⁶ .................. H04M 1/00; H04N 11/00
[52] U.S. Cl. .................. 358/434; 358/436; 358/438; 379/100.15; 379/100.16
[58] Field of Search .................. 358/406, 434–436, 358/438; 379/100, 100.15, 100.16, 100.06

[56] References Cited

U.S. PATENT DOCUMENTS

| | | | |
|---|---|---|---|
| 4,908,851 | 3/1990 | Kotani et al. | 379/100 |
| 4,939,767 | 7/1990 | Saito et al. | 358/434 |
| 5,056,132 | 10/1991 | Coleman et al. | 379/100.16 |
| 5,091,932 | 2/1992 | Tsuda | 379/100.15 |
| 5,144,650 | 9/1992 | Kiguchi | 379/100 |
| 5,150,400 | 9/1992 | Ukegawa | 358/406 |
| 5,202,915 | 4/1993 | Nishii | 379/100.15 |
| 5,222,126 | 6/1993 | Nishino | 379/100 |
| 5,260,991 | 11/1993 | Ikegaya | 379/100.15 |
| 5,333,179 | 7/1994 | Yamamoto et al. | 379/100 |
| 5,444,771 | 8/1995 | Ohnishi | 379/100.16 |
| 5,493,609 | 2/1996 | Winseck, Jr. et al. | 379/100.15 |

FOREIGN PATENT DOCUMENTS

| | | | |
|---|---|---|---|
| 43 05 481 A1 | 9/1993 | Germany | H04M 11/06 |
| 1-126653 | 8/1989 | Japan | H04M 11/00 |
| 2 250 664 | 6/1992 | United Kingdom | H04N 1/32 |

OTHER PUBLICATIONS

Patent Abstracts of Japan, The Patent Office Japanese Government, vol. 17, No. 620, p. 32 E 1460, Nov. 16, 1993, JP–A–05 191 529.

*Primary Examiner*—Edward L. Coles, Sr.
*Assistant Examiner*—Tia M. Harris
*Attorney, Agent, or Firm*—Foley & Lardner

[57] ABSTRACT

An automatic facsimile signal analyzing system includes a switch unit, a service trunk, a signal identification trunk, a facsimile communication determination unit, and a control unit. The signal identification trunk restores a facsimile control signal from a modulated and encoded facsimile signal on the set speech path and performs collection of communication state information and detection of a start of facsimile communication on the basis of the restored facsimile control signal. The facsimile communication determination unit permits an operation of the signal identification trunk when the classification result from the service trunk represents a type other than the voice signal and analyzes the communication state information from the signal identification trunk. The control unit performs switching/connection control of the switch unit, connects the service trunk and the signal identification trunk, both of which are in an idle state, to the set speech path upon setting of the speech path, disconnects the service trunk from the speech path when the classification result is output, and disconnects the signal identification trunk from the set speech path when the classification result from the service trunk represents the voice signal and when a call corresponding to the set speech path is ended.

23 Claims, 1 Drawing Sheet

AUTOMATIC FACSIMILE SIGNAL ANALYZING APPARATUS FOR A TELEPHONE EXCHANGE SYSTEM

BACKGROUND OF THE INVENTION

The present invention relates to an automatic facsimile signal analyzing system. More particularly, the invention relates to an automatic facsimile signal analyzing system for automatically identifying and analyzing a facsimile signal as one of telephone use forms of a voice-grade signal appearing on a speech path in a telephone switching system.

In a telephone switching system, conventionally, when voice-grade signals appearing on a speech path, and particularly, facsimile signals as large part of data communication are to be monitored and analyzed, a facsimile signal measurement device is connected to a communication line to be monitored. In this case, if a specific communication line is to be monitored, a facsimile signal measurement device is stationarily connected to each line. If an arbitrary line is to be monitored, the facsimile signal measurement device is appropriately manually connected to the line by a maintenance operator.

In such a conventional facsimile signal monitor/analyzing system, the telephone switching system itself has no means for identifying an incoming call as a voice call or a facsimile call. For this reason, when a facsimile call is analyzed, the facsimile signal measurement device is always connected to a predetermined line, not from the start of facsimile communication but during facsimile communication by the maintenance operator. Therefore, to monitor and analyze a facsimile call from the start of communication, the facsimile signal measurement device must be connected to a line to be monitored in advance. Additionally, a facsimile call whose incoming time cannot be anticipated must be continuously measured by the facsimile signal measurement device.

To monitor all incoming calls in the telephone switching system, facsimile signal measurement devices must be connected to all communication lines. This results in an increase in number of equipment for monitoring and analyzing facsimile signals, and at the same time, an increase in economic burden.

SUMMARY OF THE INVENTION

It is an object of the present invention to provide an automatic facsimile signal analyzing system capable of realizing efficient monitoring and analysis with a small number of equipment.

It is another object of the present invention to provide an automatic facsimile signal analyzing system capable of quickly and specifically confirming monitor and analysis results from call origination.

In order to achieve the above objects, according to the present invention, there is provided an automatic facsimile signal analyzing system comprising a switch unit for setting a speech path in accordance with an incoming call and simultaneously performing switching between a plurality of lines. There is a service trunk for classifying a voice-grade signal on the set speech path for each type of signal including a voice signal and outputting a classification result and a signal identification trunk for restoring a facsimile control signal from a modulated and encoded facsimile signal on the set speech path and performing collection of communication state information and detection of a start of facsimile communication on the basis of the restored facsimile control signal. There is also a facsimile communication determination unit for permitting an operation of the signal identification trunk when the classification result from the service, trunk represents a type other than the voice signal and analyzing the communication state information from the signal identification trunk. Further there is provided a control unit for performing switching/connection control of the switch unit, connecting the service trunk and the signal identification trunk, both of which are in an idle state, to the set speech path upon setting of the speech path, disconnecting the service trunk from the speech path when the classification result is output, and disconnecting the signal identification trunk from the set speech path when the classification result from the service trunk represents the voice signal and when a call corresponding to the set speech path is ended.

DESCRIPTION OF THE PREFERRED EMBODIMENT

Figure 1:
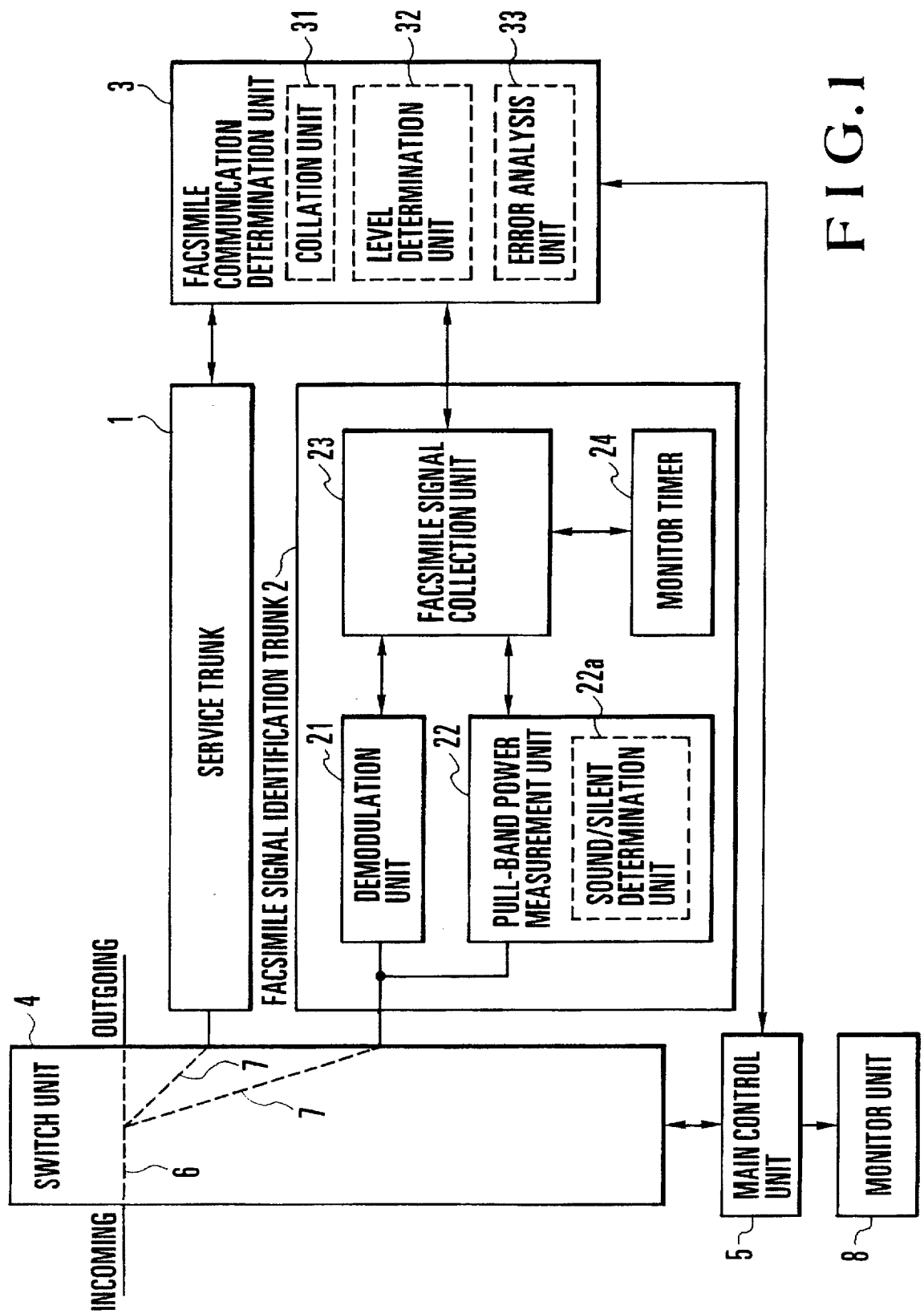
FIG. 1 is a block diagram showing an embodiment of a telephone switching system to which an automatic facsimile signal analyzing system of the present invention is applied.

The present invention will be described below with reference to the accompanying drawing.

FIG. 1 shows an embodiment of a telephone switching system to which an automatic facsimile signal analyzing system of the present invention is applied. Referring to FIG. 1, a service trunk 1 classifies and identifies a voice-grade signal on a speech path 6 for each type of signal, thereby detecting an incoming facsimile call. A facsimile signal identification trunk 2 demodulates and decodes a modulated and encoded facsimile signal on the speech path 6, collects various communication state information including a facsimile control signal, and detects the start of facsimile communication.

A facsimile communication determination unit 3 determines the continuance and discontinuance of a speech path monitor operation on the basis of the signal type classification result from the service trunk 1. Further, the facsimile communication determination unit 3 analyzes the facsimile signal on the speech path 6 on the basis of the various communication state information collected by the facsimile signal identification trunk 2.

A switch unit 4 sequentially sets the speech path 6 and performs switching/connection of a plurality of lines upon call incoming. At the same time, the switch unit 4 connects the service trunk 1 and the facsimile signal identification trunk 2 to the speech path 6 to be monitored. A main control unit 5 designates the facsimile communication determination unit 3 to start a speech path monitor operation upon call incoming and simultaneously controls setting of the speech path 6 and a connection path 7 in the switch unit 4. A monitor unit 8 displays an analysis result and the like informed from the facsimile communication determination unit 3 to the main control unit 5. The monitor unit 8 may also be connected to the facsimile communication determination unit 3 and stores the analysis result.

Both the number of service trunks 1 and the number of facsimile signal identification trunks 2 are smaller than the capacity of the speech path 6 of the switching system. One idle service trunk 1 and one idle facsimile signal identification trunk 2 are selected and connected to the set speech path 6 through the connection paths 7. For illustrative convenience, FIG. 1 shows a state wherein only one idle service trunk 1 and one idle facsimile signal identification trunk 2 are selected and connected to the speech path 6 to be monitored.

The facsimile signal identification trunk 2 is constituted by a demodulation unit 21, a full-band power measurement unit 22, a facsimile signal collection unit 23, and a monitor timer 24. The demodulation unit 21 demodulates and decodes the modulated and encoded facsimile signal on the speech path 6. The demodulation unit 2 also performs error monitoring on the restored facsimile control signal and detects the start of facsimile communication on the basis of a predetermined facsimile control signal. The full-band power measurement unit 22 continuously measures the full-band power in sound and silent states of the signal on the speech path 6 for a predetermined period of time and outputs various electric energies. Upon detection of the start of facsimile communication by the demodulation unit 21, the facsimile signal collection unit 23 collects the facsimile control signal restored by the demodulation unit 21, and at the same time collects the various electric energies measured by the full-band power measurement unit 22, thereby outputting communication state information including an error monitor result, the collected facsimile control signals, and the various electric energies. The monitor timer 24 monitors the duration of the speech path monitor state by the facsimile signal identification trunk 2.

The facsimile communication determination unit 3 is constituted by a collation unit 31, a level determination unit 32, and an error analysis unit 33. The collation unit 31 collates the facsimile control signal output from the facsimile signal collection unit 23 of the facsimile signal identification trunk 2 with a predetermined facsimile control sequence which is stored in advance. The level determination unit 32 determines, on the basis of the various electric energies output from the facsimile signal collection unit 23, whether the noise level and the signal level have appropriate values. The error analysis unit 33 analyzes the error monitor result output from the facsimile signal collection unit 23.

An operation performed upon call incoming in the telephone switching system will be described below with reference to FIG. 1. Upon detection of call incoming from an incoming line, the main control unit 5 is engaged with an outgoing line to be connected to the call destination and controls the switch unit 4 to set the speech path 6 serving as a two-way speech path for transmission/reception. At the same time, the main control unit 5 designates the facsimile communication determination unit 3 to start the speech path monitor operation. In accordance with the designation for starting the speech path monitor operation, the facsimile communication determination unit 3 selects and is engaged with one of the plurality of service trunks 1 and one of the plurality of facsimile signal identification trunks 2, both of which are in an idle state, and designates the selected trunks to start the speech path monitor operation.

The facsimile communication determination unit 3 informs the main control unit 5 of the selected and engaged service trunk 1 and facsimile signal identification trunk 2. Upon reception of this information, the main control unit 5 controls the switch unit 4 to set the connection paths 7 for connecting the service trunk 1 and the facsimile signal identification trunk 2 to the target monitor speech path 6 set upon call incoming.

In accordance with the designation for starting the speech path monitor operation, the service trunk 1 connected to the speech path 6 classifies voice-grade signals on the speech path 6, which are input through the connection path 7, into six types, i.e., a voice signal, a telephone switching voice-grade signal such as a busy tone, a data signal such as a facsimile signal, an acknowledge tone signal before or after data transmission, an unclassifiable sound signal, and a silent signal. This classification result is output to the facsimile communication determination unit 3. After informing the classification result, the service trunk 1 is shifted from the speech path monitor state to an idle state and waits for the next start of the speech path monitor operation. When information representing that the service trunk 1 is set in the idle state is received directly or through the facsimile communication determination unit 3, the main control unit 5 controls the switch unit 4 to disconnect the connection path 7 of the service trunk 1.

In accordance with the designation for starting the speech path monitor operation, which is received from the facsimile communication determination unit 3, the facsimile signal identification trunk 2 connected to the speech path 6 starts the monitor timer 24 through the facsimile signal collection unit 23 and enables the demodulation unit 21 and the full-band power measurement unit 22. The demodulation unit 21 starts to demodulate the voice-grade signals on the speech path 6, which are input through the connection path 7. With this operation, extraction of the restored tonal or binary code facsimile control signals and detection of a line engagement signal or a communication preparation signal at the start of communication are enabled.

If it is informed as the classification result from the service trunk 1 that the voice-grade signals on the speech path 6 are voice signals both ways, the facsimile communication determination unit 3 designates the facsimile signal identification trunk 2 to stop the speech path monitor operation and shifts the facsimile signal identification trunk 2 from the speech path monitor state to an idle state. Simultaneously, the facsimile communication determination unit 3 informs the main control unit 5 that this call is voice communication, thereby ending the series of speech path monitor operations. The main control unit 5 controls the switch unit 4 to disconnect the connection path 7 for connecting the facsimile signal identification trunk 2 to the speech path 6 which has the informed voice communication thereon and causes the facsimile signal identification trunk 2 to wait for the next monitor operation.

Assume that it is informed as the classification result from the service trunk 1 that the voice-grade signals on the speech path 6 have a combination other than a combination of voice signals on both the ways, i.e., that the voice-grade signal in either way includes a telephone switching voice-grade signal, a data signal such as a facsimile signal, an acknowledge tone signal, an unclassifiable sound signal, or a silent signal. In this case, the facsimile communication determination unit 3 continues the speech path monitor operation by the facsimile signal identification trunk 2 until a designation for ending the speech path monitor operation is received from the main control unit 5, or the monitor timer 24 in the facsimile signal identification trunk 2 finishes counting the set time.

In the speech path monitor state, the facsimile signal identification trunk 2 collects the communication state information in the following manner. The demodulation unit 21 detects, restores, and outputs the facsimile control signal consisting of a tonal signal or a binary control signal, which is used in facsimile communication. At the same time, the demodulation unit 21 detects the start of facsimile communication on the basis of the restored facsimile control signal. Additionally, the demodulation unit 21 monitors the frame check sequence of the binary code facsimile control signal. If the result is false, it is output to the facsimile signal collection unit 23 as an error in the facsimile control signal.

The facsimile signal collection unit 23 sequentially receives the facsimile control signal restored by the demodulation unit 21. Upon reception of a facsimile control signal representing the end of facsimile communication, the facsimile signal collection unit 23 stores the sequentially received facsimile control signal, the check result, and the transmission direction of each facsimile control signal together with the relative time between the current facsimile signal and the immediately preceding facsimile signal. This relative time is obtained from the monitor timer 24. When a data frame error based on the frame check sequence is informed from the demodulation unit 21, this information is also similarly stored.

Of the facsimile control signals from the demodulation unit 21, when a predetermined facsimile control signal is received, the facsimile signal collection unit 23 determines, from the facsimile communication state, a time zone when a facsimile signal is present on the speech path 6 (sound state) and a time zone when no facsimile signal is present (silent state). The facsimile signal collection unit 23 starts sound/silent power measurement every time zone, thereby designating the full-band power measurement unit 22 to start power measurement. In accordance with this designation, the full-band power measurement unit 22 continuously measures the power for a predetermined period of time and outputs the maximum, minimum, and average values of the obtained full-band electric energies to the facsimile signal collection unit 23.

The full-band power measurement unit 22 has a sound/silent determination unit 22a based of a threshold representing a predetermined electric energy. When a silent state is determined by the sound/silent determination unit 22a during sound electric energy measurement, sound measurement is started again from the point of time when the sound state has been determined. When a silent state is determined during measurement, measurement is immediately interrupted. Various electric energies measured immediately before the interruption are informed to the facsimile communication determination unit 3 through the facsimile signal collection unit 23 as a measurement result. Similarly, when a sound state is determined by the sound/silent determination unit 22a during silent electric energy measurement, the full-band power measurement unit 22 starts silent measurement again from the point of time when the silent state has been determined. When a sound state is determined during measurement, measurement is immediately interrupted. Various electric energies measured immediately before the interruption are informed to the facsimile communication determination unit 3 through the facsimile signal collection unit 23 as a measurement result.

Upon detection of disconnection of the call under monitor, the main control unit 5 disconnects the speech path 6 and the connection path 7 set in the switch unit 4 and informs the facsimile communication determination unit 3 that the call is disconnected. When this information is received, or when the monitor timer 24 of the facsimile signal identification trunk 2 finishes counting the set time, the facsimile communication determination unit 3 designates the facsimile signal identification trunk 2 to end the speech path monitor operation, and shifts the facsimile signal identification trunk 2 from the speech path monitor state to an idle state. In accordance with the designation for ending the speech path monitor operation, which is received from the facsimile communication determination unit 3, the facsimile signal collection unit 23 outputs information stored so far during the speech path monitor operation, i.e., collected communication state information including the facsimile signals and the full-band electric energies (maximum, minimum, and average values) in the sound/silent state, together with the details of abnormality detection as needed, to the facsimile communication determination unit 3.

The collation unit 31 of the facsimile communication determination unit 3 collates communication procedures generated in advance in accordance with the procedures for document facsimile transmission in a known general switching telephone network with the facsimile control signals included in the communication state information obtained from the facsimile signal identification trunk 2. With this operation, the collation unit 31 checks the reception order of the facsimile control signals and also checks whether the received facsimile control signal is a defined known signal or an undefined signal, and analyzes the normality of parameters set in the facsimile signals.

The level determination unit 32 calculates, on the basis of the various measurement results of the full-band electric energies in the communication state information obtained from the facsimile signal identification trunk 2, a facsimile communication signal level and a noise level as communication quality information for the facsimile communication to be monitored, thereby determining whether each level exhibits an appropriate value. The error analysis unit 33 analyzes the error in the facsimile signal on the basis of the error monitor result in the communication state information.

The facsimile communication determination unit 3 sends back the results from the collation unit 31, the level determination unit 32, and the error analysis unit 33 to the main control unit 5 of the telephone switching system as detailed information for the call corresponding to the speech path 6, thereby ending the series of communication monitor operations.

Assume that an abnormality such as a communication failure is detected when the collation unit 31 collates the facsimile control signals in the communication state information or analyzes the parameters in the facsimile signals. In this case, the details of this abnormality are sent to the main control unit 5 together with the above detailed information of the call. The main control unit 5 displays the detailed information from the facsimile communication determination unit 3 on the monitor unit 8. The maintenance personnel and the like monitor the communication state from the start of the facsimile communication.

As has been described above, according to the present invention, upon call incoming, the service trunk is temporarily connected to a speech path to automatically classify the types of signals. If it is determined on the basis of the classification result that the speech path is in communication other than voice communication, e.g., a facsimile call, the speech path monitor operation by the facsimile signal identification trunk from the call origination is continued. If it is determined on the basis of the classification result from the service trunk that the speech path is in voice communication, the facsimile signal identification trunk interrupts the speech path monitor operation and opens the speech path. For this reason, the service trunk and the facsimile signal identification trunk are selectively connected to the speech path as needed, and the speech path monitor operation can also be performed from the call origination. Therefore, efficient monitor and analysis can be realized with a small number of equipments. At the same time, all facsimile calls incoming to an arbitrary line accommodated in the telephone switching system can be automatically analyzed.

In addition, the facsimile control signals transferred during facsimile communication can be analyzed in real time on the basis of the collected communication state information.

Therefore, an abnormality such as a communication failure can be quickly and specifically confirmed.

What is claimed is:

1. An automatic facsimile signal analyzing apparatus of a telephone exchange system comprising:

a switch unit for setting speech paths in accordance with a plurality of asynchronous incoming calls and simultaneously performing a plurality of switching connections;

a plurality of service trunks for classifying a voice-grade signal on said speech path for each type of signal including a voice signal, and outputting a classification result;

a plurality of signal identification trunks for restoring a facsimile control signal from a modulated and encoded facsimile signal on said speech path, and performing collection of communication state information and detection of a start of facsimile communication on the basis of the restored facsimile control signal;

a facsimile communication determination unit for permitting a continuing operation of said signal identification trunk when the classification result from said service trunk represents a type other than the voice signal and analyzing the communication state information collected by the signal identification trunk; and a control unit for performing switching and connection control of said switch unit, connecting said service trunk and said signal identification trunk, both of which are in an idle state, to said speech path upon setting of said speech path, disconnecting said service trunk from said speech path when the classification result is output from said service trunk, and disconnecting said signal identification trunk from said speech path when the classification result from said service trunk represents the voice signal and when the incoming call corresponding to said speech path is ended.

2. An apparatus according to claim 1, wherein said signal identification trunk comprises:

demodulation means for demodulating and decoding the facsimile signal on said speech path, extracting the restored facsimile control signal, and detecting predetermined facsimile control signal, thereby detecting the start of facsimile communication;

power measurement means for measuring a full-band electric energy of the modulated and encoded facsimile signal on said speech path for a predetermined period of time, and outputting maximum, minimum, and average electric energies; and facsimile signal collection means for, when the start of facsimile communication is detected by said demodulation means, collecting the facsimile control signal extracted by said demodulation means, collecting the measured maximum, minimum, and average electric energies from said power measurement means, and outputting the communication state information including the collected facsimile control signal and the measured electric energies to said facsimile communication determination unit.

3. An apparatus according to claim 2, wherein said facsimile communication determination unit comprises:

collation means for collating the facsimile control signal included in the communication state information output from said signal identification trunk with a predetermined facsimile control sequence; and level determination means for determining, on the basis of the measured maximum and minimum electric energies included in the communication state information output from said signal identification trunk, whether a noise level and a communication signal level have appropriate values.

4. An apparatus according to claim 3, wherein said demodulation means performs error monitoring of the restored facsimile control signal and outputs an error monitor result to said facsimile signal collection means as the communication state information, and said facsimile communication determination unit has error analysis means for analyzing the error monitor result included in the communication state information output from said signal identification trunk.

5. An apparatus according to claim 1, wherein said service trunk classifies the voice-grade signal on said speech path into types of signals including the voice signal, a telephone switching voice-grade signal including a busy tone, a data signal including a facsimile signal, an acknowledge tone signal sent before and after data transmission, an unclassifiable sound signal, and a silent signal.

6. An apparatus according to claim 1, further comprising timer means, started when a speech path monitor operation starts, for monitoring and indicating whether a speech path monitor state has continued for a predetermined period of time, and wherein said control unit controls said switch unit when said timer means indicates an elapse of the predetermined period of time, to disconnect said signal identification trunk from said speech path.

7. An apparatus according to claim 6, wherein said signal identification trunk sets detection times to communication state information in accordance with time information obtained from said timer means.

8. An apparatus according to claim 1, wherein said facsimile communication determination unit selects said service trunk and said signal identification trunk, both of which are in the idle state, and sets said service trunk and said signal identification trunk in a speech path monitor state in accordance with a designation for starting speech path monitor from said control unit upon call incoming, and said control unit connects said service trunk and said signal identification trunk, both of which are selected by said facsimile communication determination unit, to said set speech path.

9. An apparatus according to claim 1, further comprising monitor means for displaying an analysis result of the communication state information by said facsimile communication determination unit on a monitor.

10. An apparatus according to claim 1, wherein, upon detection of disconnection of the incoming call under monitor, said control unit controls said switch unit to disconnect said signal identification trunk from said speech path.

11. An automatic facsimile signal analyzing apparatus of a telephone exchange system comprising:

a switch unit for setting speech paths in accordance with a plurality of asynchronous incoming calls and simultaneously performing a plurality of switching connections;

a plurality of service trunks for classifying a voice-grade signal on said speech path for each type of signal including a voice signal, and outputting a classification result;

a plurality of signal identification trunks for restoring a facsimile control signal from a modulated and encoded facsimile signal on said speech path, and performing collection of communication state information and detection of a start of facsimile communication on the basis of the restored facsimile control signal;

a facsimile communication determination unit for permitting a continuing operation of said signal identification trunk when the classification result from said service trunk represents a type other than the voice signal and analyzing the communication state information collected by the signal identification trunk;

a control unit for performing switching and connection control of said switch unit, connecting said service trunk and said signal identification trunk, both of which are in an idle state, to said speech path upon setting of said speech path, disconnecting said service trunk from said speech path when the classification result is output from said service trunk, and disconnecting said signal identification trunk from said speech path when the classification result from said service trunk represents the voice signal and when the incoming call corresponding to said speech path is ended;

wherein said signal identification trunk includes:

demodulation means for demodulating and decoding the facsimile signal on said speech path, extracting the restored facsimile control signal, and detecting predetermined facsimile control signal, thereby detecting the start of facsimile communication;

power measurement means for measuring a full-band electric energy of the modulated and encoded facsimile signal on said speech path for a predetermined period of time, and outputting maximum, minimum, and average electric energies; and facsimile signal collection means for, when the start of facsimile communication is detected by said demodulation means, collecting the facsimile control signal extracted by said demodulation means, collecting the measured maximum, minimum, and average electric energies from said power measurement means, and outputting the communication state information including the collected facsimile control signal and the measured electric energies to said facsimile communication determination unit; and wherein said facsimile communication determination unit selects said service trunk and said signal identification trunk, both of which are in the idle state, and sets said service trunk and said signal identification trunk in a speech path monitor state in accordance with a designation for starting speech path monitor from said control unit upon call incoming, and said control unit connects said service trunk and said signal identification trunk, both of which are selected by said facsimile communication determination unit, to said set speech path.

12. An apparatus according to claim 11, wherein said service trunk classifies the voice-grade signal on said speech path into types of signals including the voice signal, a telephone switching voice-grade signal including a busy tone, a data signal including a facsimile signal, an acknowledge tone signal sent before and after data transmission, an unclassifiable sound signal, and a silent signal.

13. An apparatus according to claim 11, further comprising timer means, started when a speech path monitor operation starts, for monitoring and indicating whether a speech path monitor state has continued for a predetermined period of time, and wherein said control unit controls said switch unit when said timer means indicates an elapse of the predetermined period of time, to disconnect said signal identification trunk from said speech path.

14. An automatic facsimile signal analyzing apparatus of a telephone exchange system comprising:

a switch unit for setting speech paths in accordance with a plurality of asynchronous incoming calls and simultaneously performing a plurality of switching connections;

a plurality of service trunks for classifying a voice-grade signal on said speech path for each type of signal including a voice signal, and outputting a classification result;

a plurality of signal identification trunks for restoring a facsimile control signal from a modulated and encoded facsimile signal on said speech path, and performing collection of communication state information and detection of a start of facsimile communication on the basis of the restored facsimile control signal;

a facsimile communication determination unit for permitting a continuing operation of said signal identification trunk when the classification result from said service trunk represents a type other than the voice signal and analyzing the communication state information collected by the signal identification trunk;

a control unit for performing switching and connection control of said switch unit, connecting said service trunk and said signal identification trunk, both of which are in an idle state, to said speech path upon setting of said speech path, disconnecting said service trunk from said speech path when the classification result is output from said service trunk, and disconnecting said signal identification trunk from said speech path when the classification result from said service trunk represents the voice signal and when the incoming call corresponding to said speech path is ended;

wherein said signal identification trunk includes:

demodulation means for demodulating and decoding the facsimile signal on said speech path, extracting the restored facsimile control signal, and detecting a predetermined facsimile control signal, thereby detecting the start of facsimile communication; and power measurement means for measuring a full-band electric energy of the modulated and encoded facsimile signal on said speech path for a predetermined period of time, and outputting maximum, minimum, and average electric energies;

facsimile signal collection means for, when the start of facsimile communication is detected by said demodulation means, collecting the facsimile control signal extracted by said demodulation means, collecting the measured maximum, minimum, and average electric energies from said power measurement means, and outputting the communication state information including the collected facsimile control signal and the measured electric energies to said facsimile communication determination unit;

wherein said facsimile communication determination unit includes:

collation means for collating the facsimile control signal included in the communication state information output from said signal identification trunk with a predetermined facsimile control sequence; and level determination means for determining, on the basis of the measured maximum and minimum electric energies included in the communication state information output from said signal identification trunk, whether a noise level and a communication signal level have appropriate values;

wherein said demodulation means performs error monitoring of the restored facsimile control signal and outputs an error monitor result to said facsimile signal collection means as the communication state information, and said facsimile communication determination unit has error analysis means for analyzing the error monitor result included in the communication state information output from said signal identification trunk;

wherein said service trunk classifies the voice-grade signal on said speech path into types of signals including the voice signal, a telephone switching voice-grade signal including a busy tone, a data signal including a facsimile signal, an acknowledge tone signal sent before and after data transmission, an unclassifiable sound signal, and a silent signal;

timer means, started when a speech path monitor operation starts, for monitoring and indicating whether a speech path monitor state has continued for a predetermined period of time, and wherein said control unit controls said switch unit when said timer means indicates an elapse of the predetermined period of time, to disconnect said signal identification trunk from said speech path;

wherein said facsimile communication determination unit selects said service trunk and said signal identification trunk, both of which are in the idle state, and sets said service trunk and said signal identification trunk in a speech path monitor state in accordance with a designation for starting speech path monitor from said control unit upon call incoming, and said control unit connects said service trunk and said signal identification trunk, both of which are selected by said facsimile communication determination unit, to said set speech path; and wherein, upon detection of disconnection of the incoming call under monitor, said control unit controls said switch unit to disconnect said signal identification trunk from said speech path.

15. An apparatus according to claim 1, wherein the switch unit has a predetermined capacity for setting the speech paths.

16. An apparatus according to claim 1, wherein the switch unit sets the speech paths to the plurality of asynchronous incoming calls and makes simultaneous the plurality of switching connections to the service trunks and signal identification trunks.

17. An apparatus according to claim 1, wherein the number of service trunks and the number of the signal identification trunks are smaller than the speech path capacity of the switching unit.

18. An apparatus according to claim 11, wherein the switch unit has a predetermined capacity for setting the speech paths.

19. An apparatus according to claim 11, wherein the switch unit sets the speech paths to the plurality of asynchronous incoming calls and makes simultaneous the plurality of switching connections to the service trunks and signal identification trunks.

20. An apparatus according to claim 11, wherein the number of the signal identification trunks are smaller than the speech path capacity of the switching unit.

21. An apparatus according to claim 14, wherein the switch unit has a predetermined capacity for setting the speech paths.

22. An apparatus according to claim 14, wherein the switch unit sets the speech paths to the plurality of asynchronous incoming calls and makes simultaneous the plurality of switching connections to the service trunks and signal identification trunks.

23. An apparatus according to claim 14, wherein the number of the signal identification trunks are smaller than the speech path capacity of the switching unit.

* * * * *